United States Patent [19]

Lange

[11] 4,096,506
[45] Jun. 20, 1978

[54] COVER PLATE FOR OPTICAL ELEMENTS OF A CAMERA

[75] Inventor: Karl-Heinz Lange, Bunde, Germany
[73] Assignee: Balda-Werke, Bunde, Germany
[21] Appl. No.: 729,872
[22] Filed: Oct. 5, 1976
[30] Foreign Application Priority Data
  Jul. 29, 1976 Germany .................. 7623866[U]
[51] Int. Cl.² .................................. G03B 17/02
[52] U.S. Cl. .............................. 354/288; 354/253
[58] Field of Search ............. 354/253, 288; 350/61, 350/65

[56] References Cited

U.S. PATENT DOCUMENTS

| | | | |
|---|---|---|---|
| 3,256,793 | 6/1966 | Denk et al. | 354/288 |
| 3,798,670 | 3/1974 | Tanaka | 354/253 X |
| 3,810,227 | 5/1974 | Tanaka | 354/253 |
| 3,836,985 | 9/1974 | Lange | 354/288 |

FOREIGN PATENT DOCUMENTS

| | | | |
|---|---|---|---|
| 2,223,110 | 11/1973 | Germany | 354/288 |
| 1,420,496 | 1/1976 | United Kingdom | 354/288 |

*Primary Examiner*—Edna M. O'Connor
*Attorney, Agent, or Firm*—Howard I. Schuldenfrei

[57] ABSTRACT

A cover plate is provided which is especially suited to an instant picture type camera employing mirror image deflection for picture taking. However, this cover plate is suited to any still camera having a substantially planar contiguously grouped optical element arrangement. The cover plate is longitudinally slidably mounted in the camera housing relative to the normal viewing position of the camera, and is reciprocally movable between a first position overlying the optical elements mounted in the camera housing and a second position vertically distal thereto.

10 Claims, 5 Drawing Figures

COVER PLATE FOR OPTICAL ELEMENTS OF A CAMERA

BACKGROUND OF THE INVENTION

The instant invention relates generally to camera accessories, and more particularly to an improved sliding over plate for the protection of optical elements of a camera.

It has been found to be desirable to provide cameras, particularly still picture type cameras, with a cover plate for the protection of the optical elements thereof, which is releasably mountable over the optical elements when the camera is not in use. It is especially desirable to integrally connect the cover plate to the camera housing.

For compactness, maneuverability and aesthetics, it is desirable for the cover plate to travel between covering and uncovering positions within the plane of the camera housing. Particularly when such cover plates are mounted in the sleek instant picture type model cameras having optical elements, including the lens, viewer, photocell, and even the shutter release, substantially contiguously arranged transversely across the front panel of the camera housing, it is imperative for the cover plate to be longitudinally movable in a plane transverse to the front panel of the camera housing to avoid blockage of the optical elements, and preserve the sleek compact appearance of the model.

The movable cover plates heretofore known have had a tendency to cant after continuous and constant usage. The cant of the cover plate has increased until the cover plate has separated from the camera housing, requiring a repair.

Accordingly, the present invention provides a longitudinally slidable cover plate for a camera of the type described herein which does not cant with use. Cover plates within the scope of this invention may be installed in conventional cameras without modification of the basic camera design. These cover plates are simply constructed, durable and economical.

SUMMARY OF THE INVENTION

Generally speaking, in accordance with the invention, a cover plate is provided which is especially suited to an instant photograph type camera employing mirror image deflection for picture taking. However, this cover plate is suited to any still camera having a substantially planar contiguously grouped optical element arrangement. The cover plate is longitudinally slidably mounted in the camera housing relative to the normal viewing position of the camera, and is reciprocally movable between a first position overlying the optical elements mounted in the camera housing and a second position vertically distal thereto.

According to one embodiment of the invention, the surface of the cover plate facing inwardly towards the optical elements includes at least one vertically oriented rib, and preferably two such ribs in closely spaced parallel relationship. For each such rib on the cover plate, the front panel in which the optical elements are mounted includes a corresponding elongated recess in which the rib is slidably mounted. The cover plate and camera housing may include cooperable means for determining first and second positions of the cover plate on the camera housing corresponding, respectively, to the relative positions as hereinbefore set forth.

According to another embodiment of the invention, the relationship between each rib and its corresponding recess is reversed. In this embodiment, at least one vertically oriented recess is carried in the cover plate and at least one corresponding elongated rib is mounted on the housing panel carrying the optical elements. Except for this reversal in the respective positions of the ribs and recesses, this embodiment is otherwise identical to the embodiment hereinbefore described.

According to still another embodiment of the invention, each of the ribs includes a gear driven rack, and a driving means is provided for driving the rack and, concomitantly, the cover plate from the second position thereof to the first. A brake may be operatively connected to the drive means to releasably brake the cover plate in the second position thereof. Cooperable means may be provided in the cover plate and camera housing for releasably locking the cover plate in the first position thereof.

Accordingly, it is an object of the invention to provide an improved sliding cover plate for the protection of optical elements of a camera.

Another object of the invention is to provide a longitudinally slidable cover plate for a still picture type camera.

A further object of the invention is to provide a slidable cover plate for a camera which does not cant with use.

Still another object of the invention is to provide a slidable cover plate for an instant picture type camera which may be used in connection therewith without modification of the basic camera design.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE INVENTION

Figure 1:
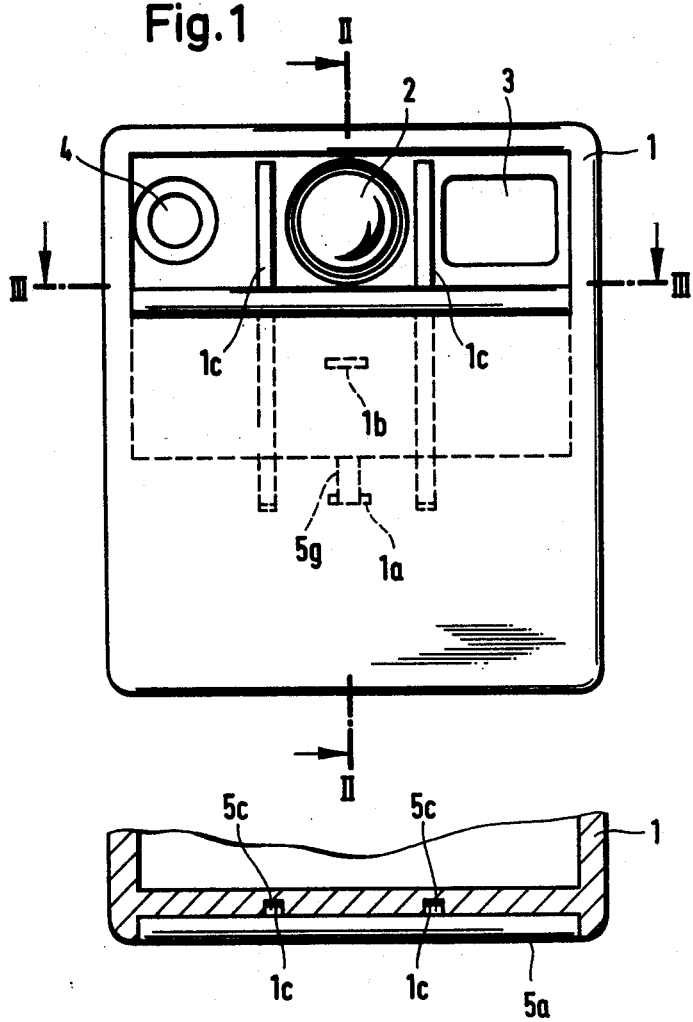
FIG. 1 is an elevated front view of a camera carrying one embodiment of a cover plate constructed according to the instant invention.
Figure 2:
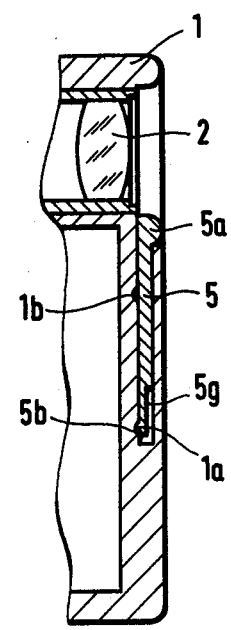
FIG. 2 is a sectional view taken along line II—II of FIG. 1.
Figure 3:
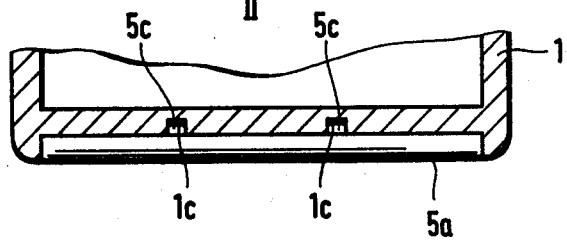
FIG. 3 is a sectional view taken along line III—III of FIG. 1.

Referring now to the Drawings, and particularly to FIGS. 1–3, a cover plate generally numbered 5 is slidably mounted in a camera housing generally numbered 1 having an optometric front panel which is recessed relative to the front panel of the housing 1. Mounted in the optometric front panel in closely spaced contiguously aligned relationship are a lens 2, a viewer 3, and a photo-cell 4.

As seen in FIGS. 1 and 2, the front panel of the housing has a window therein exposing the optometric front panel, the window being framed on three contiguous sides by a marginal lip of the front panel of the housing and on a fourth adjacent side by a beveled edge thereof. A blind channel is formed in the front panel of the housing extending longitudinally downwardly from the beveled edge thereof, and cover plate 5 is slidably mounted therein.

Cover plate 5 is reciprocally longitudinally slidable from the second position seen in FIGS. 1-3 to a first position overlying the optometric front panel and filling the window formed in the front panel of the housing. Vertically aligned in close parallel spaced relationship on the inner surface of the cover plate 5 are a pair of ribs 5c which each matingly engage in a corresponding pair of female recesses 1c formed in the optometric front panel of the housing and extend downwardly into the blind channel integrally formed therewith. Recesses 1c are each at least twice the vertical length of the ribs 5c engaged therein and the ribs 5c and recesses 1c cooperate to guide the path of cover plate 5 as it is moved between first and second positions thereof.

It is a significant feature of this embodiment that ribs 5c and corresponding recesses 1c are formed intermediately, respectively, on cover plate 5 and housing 1. The median movement of these elements contributes substantially to the non-canting feature of cover plate 5.

As best seen in FIGS. 1 and 2, means are provided for releasably securing cover plate 5 on housing 1 in the respective first and second positions thereof. A pair of vertically aligned laterally elongated depressions 1a and 1b are formed in housing 1 below the optometric front panel thereof in close spaced parallel relationship corresponding respectively to the second and first positions of cover plate 5 on housing 1. Medianly depending from the bottom edge of cover plate 5 is a resiliently elastic tongue 5g vertically aligned with depressions 1a and 1b. Tongue 5g terminates in an interiorly facing rib 5b having a smoothened surface of expanded semi-circular cross-section which is registrable, respectively, in depressions 1a and 1b when cover plate 5 is correspondingly in its second and first positions.

As best seen in FIG. 2, an outwardly facing lip 5a is is formed along the lateral upper edge of cover plate 5 which fits complementarily against the beveled edge in the front panel of the housing. When cover plate 5 is in the second position as seen in FIG. 2, gentle upward pressure may be applied to lip 5a to release rib 5b from depression 1a and cam rib 5b upwardly on the channel surface of the housing as cover plate 5 is moved upwardly into its first position, until rib 5b registers in depression 1a. To move cover plate 5 from the first to second positions, gentle downward pressure is applied along lip 5a and, in the upright position seen in FIG. 1, cover plate 5 is carried downwardly by gravity until rib 5b registers in depression 1a.

Figure 4:
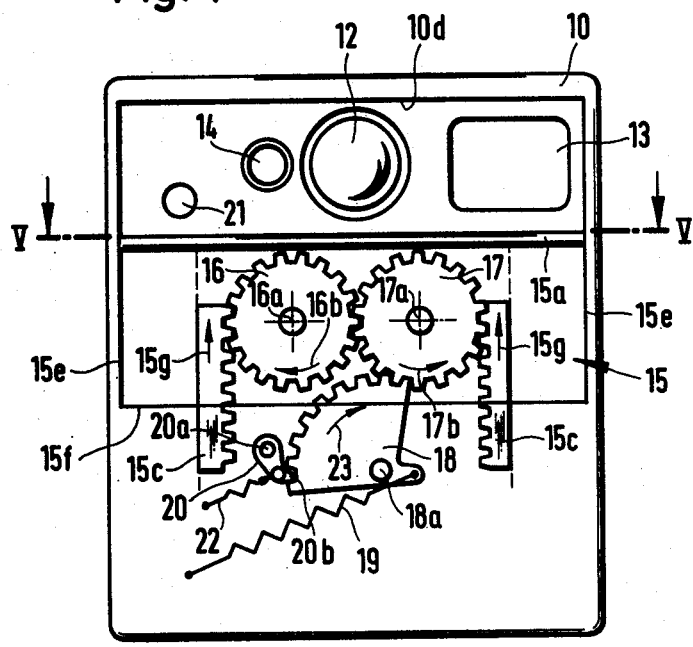
FIG. 4 is an elevated front view of a camera carrying another embodiment of a cover plate constructed according to the instant invention, the representation being partially schematic.
Figure 5:
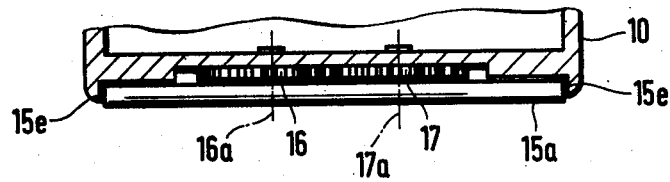
FIG. 5 is a sectional view taken along line V-V of FIG. 4.

Referring now to the embodiment seen in FIGS. 4 and 5, the camera housing 10 has the same general shape as heretofore seen in connection with the embodiment described in FIGS. 1-3. The recessed optical panel, however, has a different arrangement of elements including a lens 12, a viewer 13, a photocell 14, and a shutter release 21. The framed window formed in this embodiment of the housing for the purpose of displaying the optical panel is longitudinally longer by about twice its length in the prior embodiment, and the window occupies the surface area previously formed with the blind channel. As seen in FIG. 4, the window is framed on three sides by a marginal lip 10d and along a fourth side by a transverse edge integrally formed in the front panel of the housing.

The cover plate 15 is slidably mounted in the window, and is longitudinally reciprocally slidable between the second position seen in FIG. 2 and the first position thereof overlying the optical elements mounted in the optical panel. Opposite longitudinal edges 15e of cover plate 15 are in close spaced parallel relationship to respectively parallel corresponding opposite sections of the frame in the housing 10 defining the window therein.

An outwardly facing rib 15a is formed along the transverse upper edge of cover plate 15, and cover plate 15 may be depressed downwardly from the first to second position, seen in FIG. 4, by applying downward pressure to rib 15a. This embodiment includes a self-lift feature for sliding cover plate 15 from the second to first positions. Cover plate 15 is slidably connected to camera housing 10 by a mechanical means hereinafter set forth in detail.

A first gear wheel 16 is rotatably mounted on a pin 16a journalled in the camera housing 10, and a second gear wheel 17 which is rotatably mounted on a pin 17a also journalled in housing 10 is meshingly engaged therewith. Operatively connected with each gear wheel 16 and 17 is a respective rack 15c mounted on the rear surface of cover plate 15. A spring biased reciprocal sector gear 18, pivotally mounted on a pin 18a journalled in housing 10 is operatively connected to gear wheel 17. Sector gear 18 is biased in the direction of arrow 23, clockwise as seen in FIG. 4, by a torsion spring 19 having an end connected to sector gear 18, and another end connected to the camera housing 10.

A brake means is provided for releasably securing sector gear 18 in a first position seen in FIG. 4. The brake means comprises a pawl 20 pivotally mounted on a pin 20a journalled in housing 10, the pawl 20 including a leaf 20b engageable between corresponding leaves of sector gear 18. A compression spring 19 has an end connected to the camera housing 10 and another end connected to pawl 20 for normally biasing leaf 20b of pawl 20 between the corresponding leaves of sector gear 18, and thereby releasably fixing the position thereof.

As best seen in FIG. 5, the rack and gearing arrangement is mounted in the housing 10 in a recess formed behind the window therein. To slide cover plate 15 upwardly from the second position seen in FIG. 4 to the first position thereof overlying the optical panel, pawl 20 is pivoted out of engagement with sector gear 18 which is pivotally biased from a first to second position, thereby driving gear 17, gear 16 being cooperatively driven by gear 16. The rotative movement of gears 16 and 17 is translated to linear longitudinal upward movement through racks 15c, which are mounted on cover plate 15. As racks 15c are driven upwardly as shown by directional arrows 15g, cover plate 15 is concomitantly moved to its first position.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A slidable protective cover for the optometric elements of a camera of the type having the optometric elements thereof contiguously transversely aligned on the front panel of the camera housing thereof comprising, a substantially planar panel overfitting said front panel of said camera, first means mounted on said planar panel, said front panel of said camera housing including a second means corresponding to said first means and complementary thereto, said first and second complementary means being cooperatively connectable for sliding said panel thereon between first and second positions, said first position of said planar panel corresponding to a position of said planar panel overlying said optometric elements, said second position of said planar panel corresponding to a position of said planar panel longitudinally distal to said optometric elements, said camera housing having an interior slot in which said planar panel is reasonably housed in said second position thereof, and cooperating corresponding complementary means on said planar panel and in said camera housing for releasably securing said planar panel in said first and second positions, respectively, on said housing.

2. The slidable cover as claimed in claim 1, said first means mounted on said planar panel comprising at least one rib formed on the surface thereof, said corresponding complementary second means comprising at least one longitudinally formed recess in said housing, said at least one recess extending upwardly on said camera housing past said optometric elements mounted therein, said at least one rib being slidably engageable in said recess.

3. The slidable cover as claimed in claim 2, said at least one rib comprising a pair of said ribs formed on said surface of said panel in closely spaced parallel relationship, and said at least one recess formed in said housing comprising a pair of said recesses corresponding to said pair of ribs.

4. The slidable cover as claimed in claim 1, said cooperating corresponding means on said panel and in said camera housing for releasably securing said planar panel in said first and second positions, respectively, on said housing comprising a first and second vertically aligned laterally elongated depression formed in said housing respectively successively spaced from said optometric elements therein, said first and second depressions corresponding respectively to said first and second positions of said panel on said camera housing, and said planar panel including a resiliently elastic tongue depending therefrom, said tongue carrying a rib therein registrable in said first and second depressions for releasably securing said panel therein.

5. The slidable cover as claimed in claim 1, said housing including a channel member, said planar panel being slidably receivable in said channel member in said second position thereof.

6. The slidable cover as claimed in claim 1, said second means comprising a first and second operatively connected gear wheel, said first and second gear wheels being rotatably mounted on said camera housing, said first means comprising means for translating rotative motion of said first and second gear wheels to linear movement, said first means sliding said panel linearly on said housing as said first and second gear wheels are rotated, and means for rotating said first and second gear wheels in at least one respective direction, said rotating means being mounted on said housing.

7. The slidable cover as claimed in claim 6, said means for translating rotative motion of said gear wheels to linear movement comprising first and second racks mounted on said panel, each of said racks being operatively connected to a corresponding gear wheel.

8. The slidable cover as claimed in claim 7, said means for rotating said gear wheels comprising a sector gear pivotally mounted on said housing, said sector gear being operatively connected to at least one of said gears when said panel is in said second position thereof on said housing, and means for biasing said sector gear from a first to a second position, said sector gear rotating said gears as it moves from its first to its second positions.

9. The slidable cover as claimed in claim 8 including a brake means releasably connectable to said sector gear in said first position thereof for releasably securing said sector gear in said first positon.

10. The slidable cover as claimed in claim 9, said brake means comprising a pivotally mounted pawl having a leaf engageable with said sector gear, and means for biasing said pawl into engagement with said sector gear.

* * * * *